US010669671B2

(12) United States Patent
Skuse et al.

(10) Patent No.: US 10,669,671 B2
(45) Date of Patent: Jun. 2, 2020

(54) CEILING TILE COMPOSITIONS COMPRISING MICROFIBRILLATED CELLULOSE AND METHODS FOR MAKING SAME

(71) Applicant: FiberLean Technologies Limited, Cornwall (GB)

(72) Inventors: David Skuse, Cornwall (GB); Jonathan Stuart Phipps, Cornwall (GB); Sean Ireland, Hampden, ME (US); Yun Jin, Cornwall (GB)

(73) Assignee: FiberLean Technologies Limited, Cornwall (GB)

( * ) Notice: Subject to any disclaimer, the term of this patent is extended or adjusted under 35 U.S.C. 154(b) by 0 days.

(21) Appl. No.: 16/205,458

(22) Filed: Nov. 30, 2018

(65) Prior Publication Data

US 2019/0100880 A1    Apr. 4, 2019

Related U.S. Application Data

(63) Continuation of application No. 15/476,540, filed on Mar. 31, 2017, now abandoned.

(60) Provisional application No. 62/318,115, filed on Apr. 4, 2016.

(30) Foreign Application Priority Data

Apr. 29, 2016 (EP) ..................... 16305504

(51) Int. Cl.

| | |
|---|---|
| *D21H 13/40* | (2006.01) |
| *D21H 11/18* | (2006.01) |
| *D21H 21/18* | (2006.01) |
| *D21H 17/33* | (2006.01) |
| *D21H 17/28* | (2006.01) |
| *D21H 17/67* | (2006.01) |
| *D21H 17/68* | (2006.01) |
| *C04B 111/00* | (2006.01) |
| *C04B 111/52* | (2006.01) |
| *D21H 13/38* | (2006.01) |
| *C04B 24/38* | (2006.01) |
| *C04B 26/02* | (2006.01) |
| *C04B 26/28* | (2006.01) |

(52) U.S. Cl.
CPC .......... *D21H 13/40* (2013.01); *C04B 24/383* (2013.01); *C04B 26/02* (2013.01); *C04B 26/28* (2013.01); *C04B 26/285* (2013.01); *D21H 11/18* (2013.01); *D21H 13/38* (2013.01); *D21H 17/28* (2013.01); *D21H 17/33* (2013.01); *D21H 17/675* (2013.01); *D21H 17/68* (2013.01); *D21H 21/18* (2013.01); *C04B 2111/00603* (2013.01); *C04B 2111/52* (2013.01); *Y02W 30/97* (2015.05)

(58) Field of Classification Search
CPC ...... D21H 11/18; D21H 17/675; D21H 17/68; D21H 17/28; D21H 21/18; D21H 27/10; D21H 11/08; D21H 13/38; D21H 13/40; D21H 17/25; D21H 17/33; D21H 17/63; D21H 19/385; D21H 17/67; D21H 17/74; C04B 14/18; C04B 14/106; C04B 14/28; C04B 14/46; C04B 14/10; C04B 14/42; C04B 20/006

See application file for complete search history.

(56) References Cited

U.S. PATENT DOCUMENTS

| | | | |
|---|---|---|---|
| 1,769,519 A | 7/1930 | King | |
| 2,944,930 A * | 7/1960 | Bush, Jr. | ............. C04B 20/1029 106/648 |
| 3,246,063 A | 4/1966 | Podgurski | |
| 3,307,651 A | 3/1967 | Podgurski | |
| 3,379,608 A * | 4/1968 | Wendt | ................... C04B 26/285 162/145 |
| 3,498,404 A | 3/1970 | Roberts et al. | |
| 3,782,495 A * | 1/1974 | Nassof | .................. E04B 9/0428 181/284 |
| 3,908,062 A * | 9/1975 | Roberts | ............... B28B 19/0092 442/320 |
| 3,952,130 A * | 4/1976 | Nason | ................... C04B 26/285 428/332 |
| 4,698,257 A * | 10/1987 | Goll | ........................ C04B 30/02 156/219 |

(Continued)

FOREIGN PATENT DOCUMENTS

| | | | | |
|---|---|---|---|---|
| CA | 2765213 A1 | 12/2010 | | |
| CA | 2904784 A1 * | 9/2014 | ............. | D21H 11/08 |

(Continued)

OTHER PUBLICATIONS

International Search Report and Written Opinion for International Patent Application No. PCT/IB2017/000452, dated Aug. 14, 2017, 13 pages.

(Continued)

*Primary Examiner* — Jose A Fortuna
(74) *Attorney, Agent, or Firm* — Raymond G. Arner; Pierce Atwood LLP

(57) ABSTRACT

A composition for addition to a ceiling tile, flooring product, or other construction product may include microfibrillated cellulose and optionally an inorganic particulate material. The ceiling tile, flooring product, or other construction product may further include perlite, mineral wool, wood pulp, starch and other additives, where the wood pulp and other inorganic particulate materials are bonded to the microfibrillated cellulose. Methods of manufacturing the compound are also disclosed.

17 Claims, No Drawings

(56) References Cited

U.S. PATENT DOCUMENTS

| | | | |
|---|---|---|---|
| 4,861,822 A * | 8/1989 | Keskey | C08F 220/04 524/559 |
| 4,911,788 A * | 3/1990 | Pittman | B28B 1/526 162/145 |
| 5,013,405 A | 5/1991 | Izard | |
| 5,047,120 A * | 9/1991 | Izard | C04B 26/04 162/101 |
| 5,071,511 A * | 12/1991 | Pittman | C04B 26/285 162/145 |
| 5,194,206 A * | 3/1993 | Koch | B28B 1/526 162/225 |
| 5,395,438 A | 3/1995 | Baig et al. | |
| 5,558,710 A * | 9/1996 | Baig | C04B 18/021 106/780 |
| 5,964,934 A * | 10/1999 | Englert | C04B 14/185 106/287.1 |
| 6,187,697 B1 | 2/2001 | Jaffee et al. | |
| 6,443,256 B1 | 9/2002 | Baig | |
| 6,616,804 B2 | 9/2003 | Foster et al. | |
| 6,855,753 B1 * | 2/2005 | Englert | C04B 26/10 524/13 |
| 7,703,243 B2 | 4/2010 | Baig | |
| 7,721,499 B2 | 5/2010 | Lynch et al. | |
| 7,910,230 B2 | 3/2011 | Souza et al. | |
| 7,918,313 B2 | 4/2011 | Gross et al. | |
| 8,142,903 B2 | 3/2012 | Letts et al. | |
| 8,147,629 B2 | 4/2012 | Baig | |
| 8,546,558 B2 | 10/2013 | Ankerfors et al. | |
| 8,734,613 B1 * | 5/2014 | Frank | D21H 17/375 162/145 |
| 8,894,811 B1 * | 11/2014 | Brown | D21H 13/40 162/3 |
| 8,961,675 B2 | 2/2015 | Albarran | |
| 9,023,143 B2 | 5/2015 | Albarran | |
| 10,215,391 B2 * | 2/2019 | Newton | F21S 8/026 |
| 2002/0096278 A1 * | 7/2002 | Foster | B44C 5/04 162/141 |
| 2002/0139611 A1 | 10/2002 | Baig | |
| 2007/0001334 A1 * | 1/2007 | Pattabhi | B28B 1/44 264/87 |
| 2007/0186493 A1 | 8/2007 | Baig | |
| 2008/0121461 A1 | 5/2008 | Gross et al. | |
| 2008/0216936 A1 | 9/2008 | Baig | |
| 2009/0252941 A1 * | 10/2009 | Mueller | C04B 26/02 428/219 |
| 2010/0066121 A1 | 3/2010 | Gross | |
| 2010/0320029 A1 | 12/2010 | Cao et al. | |
| 2011/0247772 A1 * | 10/2011 | Kincaid | D21H 11/16 162/141 |
| 2011/0259537 A1 * | 10/2011 | Husband | D21B 1/30 162/4 |
| 2012/0024625 A1 | 2/2012 | Cao et al. | |
| 2012/0161058 A1 | 6/2012 | Albarran | |
| 2012/0164422 A1 | 6/2012 | Palm et al. | |
| 2012/0187226 A1 * | 7/2012 | Tarverdi | D21B 1/12 241/21 |
| 2013/0065026 A1 * | 3/2013 | Walther | D21H 27/32 428/195.1 |
| 2013/0234058 A1 | 9/2013 | Albarran | |
| 2013/0280545 A1 * | 10/2013 | Husband | D21H 17/25 428/464 |
| 2014/0034866 A9 | 2/2014 | Albarran | |
| 2015/0033983 A1 * | 2/2015 | Bilodeau | B27N 3/04 106/162.5 |
| 2015/0184345 A1 * | 7/2015 | Nelson | D21H 21/32 435/139 |
| 2015/0308111 A1 * | 10/2015 | Kemp | B32B 5/26 181/290 |
| 2015/0315747 A1 * | 11/2015 | Heiskanen | D21H 11/18 162/181.2 |
| 2017/0073893 A1 * | 3/2017 | Bilodeau | D21D 1/30 |
| 2017/0284026 A1 * | 10/2017 | Skuse | D21H 13/40 |
| 2017/0306562 A1 * | 10/2017 | Phipps | D01D 5/08 |
| 2017/0314200 A1 * | 11/2017 | Johansson | B01J 20/24 |
| 2017/0328003 A1 * | 11/2017 | Retsina | D21H 11/02 |
| 2018/0016355 A1 * | 1/2018 | Nelson | C08H 8/00 |
| 2019/0100880 A1 * | 4/2019 | Skuse | D21H 13/40 |

FOREIGN PATENT DOCUMENTS

| | | | | |
|---|---|---|---|---|
| CA | 2906283 A1 * | 9/2014 | | D21H 11/18 |
| CA | 2906283 A1 | 9/2014 | | |
| CA | 2858116 A1 * | 1/2015 | | B27N 3/04 |
| CA | 2858116 A1 | 1/2015 | | |
| CN | 104591588 A | 5/2015 | | |
| EP | 2236545 A1 * | 10/2010 | | B82Y 30/00 |
| EP | 2236545 A1 | 10/2010 | | |
| EP | 2653508 A1 * | 10/2013 | | C09D 5/04 |
| EP | 2653508 A1 | 10/2013 | | |
| EP | 2781652 A1 * | 9/2014 | | D21H 11/18 |
| EP | 2781652 A1 | 9/2014 | | |
| JP | H05-10015 A | 1/1993 | | |
| JP | 2001-058888 A | 3/2001 | | |
| JP | 2001058888 A * | 3/2001 | | C04B 28/18 |
| WO | WO-9006342 A1 * | 6/1990 | | C04B 26/04 |
| WO | 2010/131016 A2 | 11/2010 | | |
| WO | WO-2010131016 A2 * | 11/2010 | | D21B 1/30 |
| WO | 2010/148416 A2 | 12/2010 | | |
| WO | 2013/156223 A1 | 10/2013 | | |
| WO | WO-2013156223 A1 * | 10/2013 | | C09D 5/04 |
| WO | 2014/148416 A1 | 9/2014 | | |
| WO | 2017/175062 A1 | 10/2017 | | |
| WO | 2017/175063 A1 | 10/2017 | | |
| WO | WO-2017175062 A1 * | 10/2017 | | D21H 11/04 |
| WO | WO-2017175063 A1 * | 10/2017 | | D21H 13/40 |

OTHER PUBLICATIONS

Notification of Transmittal of the International Preliminary Report on Patentability for International Patent Application No. PCT/IB2017/000452, dated Jul. 12, 2018, 17 pages.

Applicant's Demand Letter dated Feb. 1, 2018 for corresponding PCT International Application No. PCT/IB2017/000452 (11 pages).

Notification of Transmittal of the International Preliminary Report dated Jul. 12, 2018 with Applicant's PCT Rule 66 Response filed May 4, 2018 (17 pages).

* cited by examiner

CEILING TILE COMPOSITIONS COMPRISING MICROFIBRILLATED CELLULOSE AND METHODS FOR MAKING SAME

CROSS REFERENCE TO RELATED APPLICATIONS

This application is a continuation of U.S. application Ser. No. 15/476,540, filed Mar. 31, 2017, which claims the priority of U.S. Provisional Patent Application No. 62/318,115, filed Apr. 4, 2016, and claims the benefit of European Patent Application No. 16305504.9, filed Apr. 29, 2016, the entire contents of which are incorporated herein by reference.

TECHNICAL FIELD

The present disclosure relates to compositions comprising microfibrillated cellulose and improved methods for increasing the strength of ceiling tiles, flooring products, and construction products, as well as improvements in the ease of manufacturing improved ceiling tiles, flooring products and construction products containing microfibrillated cellulose.

BACKGROUND

Conventional ceiling tiles are typically composed of mineral wool and/or perlite in combination with clay filler, paper pulp and starch and frequently a retention aid (flocculant) (e.g., polyacrylamide). These ingredients are made-up into a slurry in water and then filtered, pressed and dried to make a tile. In the manufacture of conventional ceiling tiles, starch is typically added in granular, ungelatinized ("uncooked") form, in order to be able to retain it in the tile in sufficient quantity for it to act as a binder in the finished tile. In this state it provides no strength to the wet tile, so wood or paper pulp is added in order to give sufficient strength to allow the tile to be pressed and formed in a continuous web. Gelatinization of the starch occurs during the drying process, and the tile develops its full strength during this phase.

Production processes for making mineral wool-containing and mineral wool-free ceiling tiles are known in the art in U.S. Pat. Nos. and 1,769,519 and 5,395,438. In the former, a composition of mineral wool fibers, fillers, colorants and a binder, in particular a starch binder is prepared for molding or casting the body of the tile. The foregoing composition is placed on suitable trays, which are covered with paper or a metallic foil and then the composition is screeded to a desired thickness with a screed bar or roller. A decorative surface may be applied by the screed bar or roller. The trays filled with the mineral wool composition are then placed in an oven for twelve hours or more to dry or cure the composition. The dried sheets are removed from the trays and may be treated on one or both faces to provide smooth surfaces, to obtain the desired thickness and to prevent warping. The sheets are then cut into tiles of a desired size. In the latter patent, mineral wool-free ceiling tiles were prepared using expanded perlite, however maintaining the starch gel binder comprising starch, wood fiber and water which was cooked to actuate the binding properties of the starch gel.

U.S. Pat. Nos. 3,246,063 and 3,307,651 disclose mineral wool acoustical tiles utilizing a starch gel as a binder. The starch gel typically comprises a thick boiling starch composition combined with calcined gypsum (calcium sulfate hemihydrate) which are added to water and cooked at 180° F.-195° F. for several minutes to form the starch gel. Thereafter, the granulated mineral wool is mixed into the starch gel to form the aqueous composition which is used to fill the trays. Ceiling tiles produced in the manner described in these patents suffer from problems in achieving a uniform density, which is an important consideration with regard to structural integrity and strength, as well as thermal and acoustical considerations.

Mineral wool acoustical tiles are very porous which is necessary to provide good sound absorption, as described in U.S. Pat. No. 3,498,404. Methods of manufacturing low density frothed mineral wool acoustical tiles are described in U.S. Pat. No. 5,013,405 which has the disadvantage of requiring a high vacuum dewatering apparatus to collapse the bubbles formed by the frothing agent and stripping the water from the mineral fiber mass.

U.S. Pat. Nos. 5,047,120 and 5,558,710 disclose that mineral fillers, such as expanded perlite, may be incorporated into the composition to improve sound absorbing properties and provide light weight. Acoustical tiles manufactured with expanded perlite typically require a high level of water to form the aqueous slurry and the expanded perlite retains a relatively high level of water within its structure.

U.S. Pat. No. 5,194,206 provides compositions and methods for substituting scrap fiberglass for mineral wool in a composition and process employing a mixture of water, starch, boric acid and fire clay heated to form a gel to which shredded fiberglass is added to form a pulp. The pulp is thereafter formed into slabs and the slabs are dried to form ceiling tiles.

U.S. Pat. No. 5,964,934 teaches a continuous process of making acoustical tiles in a water-felting process which includes the steps of dewatering and drying, the slurry composition comprising water, expanded perlite, cellulosic fiber and, optionally, a secondary binder, which may be starch, and optionally mineral wool, where the perlite has been treated with a silicone compound to reduce its water retention. The components are combined, mixed and a mar is formed and subjected to a vacuum step followed by drying at 350° C. It is noted that starch may also be used as a binder without pre-cooking the starch, because it forms a gel during the process of drying the basemat.

The components of conventional ceiling tiles have the following functions. Mineral wool/perlite provides fire resistance. Clay filler controls density and provides additional fire resistance. Paper or wood pulp binds together the other components while the slurry is wet. Starch is the main binder in a dry tile. The starch is added in granular (uncooked) form to the slurry; thus, the starch does not have any binding properties until it is "cooked" during the drying process.

Ceiling tile manufacturers typically add expanded perlite to ceiling tile formulations to serve as a lightweight aggregate. Adding expanded perlite provides a ceiling tile with air porosity, allowing the tile to have enhanced noise reduction coefficient (NRC) acoustical properties as well as low weight. Depending on the formulation, expanded perlite weight content may range between 10% and 70% by weight of the ceiling tile formulation, or even higher. In certain instances, increasing the weight percentage of expanded perlite may lower the mechanical strength (e.g., the modulus of rupture) of the ceiling tile. This lowering of mechanical strength sets a limitation on the percentage of expanded perlite that may be used in some compositions, based on the targeted mechanical strength properties for the desired ceiling tile.

The present disclosure provides alternate and improved composites for addition to ceiling tiles, flooring products, and other construction products, while maintaining or improving the properties of the final ceiling tile, flooring product or construction product. The improvements are achieved through the addition of microfibrillated cellulose, and optionally one or more organic particulate materials.

The disclosure also describes economical methods of manufacturing such composites. The improved composites comprise microfibrillated cellulose and, optionally, one or more inorganic particulate material. The improved composites may allow the removal of pulp and/or starch from a conventional ceiling tile composition, thereby allowing improvements in the manufacturing process of improved ceiling tiles, flooring products and construction products. Alternatively, the combination of microfibrillated cellulose and starch may result in a synergistic improvement in the binding of constituents of the ceiling tile composition. Such improved products may include high strength, high density and medium density ceiling tiles and wall boards. In some embodiments, the improvements in the process are through elimination of the "cooking" or drying step; at which gelatinization of the starch would normally occur.

SUMMARY

There is disclosed a ceiling tile, flooring product, or construction product comprising a composition of microfibrillated cellulose and, optionally, at least one inorganic particulate material. The ceiling tile, flooring product, or construction product may further comprise one or more inorganic particulate materials, for example, mineral wool and/or perlite, clay and/or other minerals, and, optionally, wood pulp, starch and/or a retention aid. The improved ceiling tile, flooring product, or construction product may eliminate in some embodiments the use of starch and/or organic particulate materials, for example mineral wool or perlite from the composition and the manufacturing process for such products. The improvements are achieved by the incorporation of microfibrillated cellulose into the ceiling tile composition. The microfibrillated cellulose may be bonded with wood pulp, if present, and/or mineral wool and/or perlite, and other organic particulate materials, if present.

DESCRIPTION OF EXEMPLARY EMBODIMENTS

A composition for addition to a ceiling tile, flooring product, or other construction product includes microfibrillated cellulose. In certain embodiments, the composition for addition to a ceiling tile, flooring product or other construction product includes microfibrillated cellulose and at least one inorganic particulate material.

In some embodiments, a composition of microfibrillated cellulose prepared by fibrillating a cellulose-containing pulp in the presence of inorganic particulate material, as described in this specification, may be utilized as a component of the composition for manufacturing a ceiling tile, flooring product or construction product.

In some embodiments, the composition for forming the ceiling tile, flooring product or construction product may contain an organic particulate material that is the same as, or different from, the organic particulate material used in the process of fibrillating a cellulose-containing pulp to form the microfibrillated cellulose component of the composition.

By adding a microfibrillated cellulose composition, in expense of a wood pulp or paper pulp, to a ceiling tile, flooring product or construction product composition, for example, by adding from 0.5% to 25% of a microfibrillated cellulose composition, or from 0.5% to 10% of a microfibrillated cellulose composition, it is possible to improve the modulus of rupture of ceiling tiles. Without being bound by any particular theory or hypothesis, this improvement may be brought about due to, or due at least in part to, the microfibrillated cellulose bonding with the wood or paper pulp in the ceiling tile, if present, or with the other inorganic particulate material components of the product. In some embodiments, it is even possible to totally eliminate the incorporation of wood pulp or paper pulp into the ceiling tile, flooring product or construction product composition altogether.

By adding microfibrillated cellulose composition in expense of pulp to ceiling tile, flooring product or construction product compositions, for example, by adding from 0.5% to 25% of the microfibrillated cellulose composition, or from 0.5% to 10% of the microfibrillated cellulose composition, it is possible to improve the flexural strength of a ceiling tile, flooring product or construction product. When wood pulp or paper pulp is present, the improvements in flexural strength may be due to, or due at least in part to, the microfibrillated cellulose bonding with the wood pulp or paper pulp in the product. When wood pulp or paper pulp is eliminated, the microfibrillated cellulose, nevertheless, improves tensile strength of the ceiling tile, flooring product, or construction product.

Microfibrillated cellulose has been found suitable to replace both the wood pulp or paper pulp and the starch typically present in conventional ceiling tile, flooring product or construction product.

Microfibrillated cellulose has also been found suitable to replace inorganic particulate material components present in conventional ceiling tiles, flooring products or construction products.

Microfibrillated cellulose has also been found suitable together with starch to improve the binding of inorganic and cellulosic constituents in compositions for the manufacture of ceiling tiles, flooring products and construction products.

Microfibrillated cellulose provides wet strength during formation and acts as a strong binder in the dry tile. As noted in the previous paragraph, the fact that strong ceiling tiles, flooring products or construction products can be made without wood pulp or paper pulp suggests that the microfibrillated cellulose binds well to the inorganic particulate material components of the ceiling tiles, flooring products or construction products.

Alternatively, the incorporation of microfibrillated cellulose into the ceiling tile, flooring product or construction product has been found suitable to increase the mineral wool (fibre) and/or perlite content of the ceiling tile, flooring product or construction product.

Taking advantage of the beneficial properties due to incorporation of a microfibrillated cellulose-containing composition into the ceiling tile base composition, it is possible to increase the perlite content of the ceiling tile, flooring product or construction product, e.g., increase by at least 1%, or by at least 5%, or by at least 10%, or by at least 15%, or by at least 20%, in expense of pulp. Increasing the perlite content may decrease the weight and density of the ceiling tile, flooring product or construction product, e.g., by at least 1%, or by at least 2%, or by at least 5%, or by at least 10%. This may, in turn, increase the air porosity of the ceiling tile, flooring product or construction product and, in particular with regard to ceiling tiles, the improved air porosity may thereby improve the ceiling tile's acoustic properties (e.g., sound absorption). Additionally, by increasing the perlite content in the ceiling tile, flooring product or construction product composition along with the addition of a microfibrillated cellulose composition, drainage of water may be improved and the drying time of the final product may be decreased, thereby increasing production speed of the final products.

Reducing weight of ceiling tiles by adding a microfibrillated cellulose composition may also improve storage capability in warehouses.

In addition to ceiling tiles, and flooring products, the microfibrillated cellulose composition may be used, as a component in other construction products, including, for example: cement board; gypsum board/plasterboard; insulation core of structural insulated panels and fiberboards; fiberboards of all descriptions (including oriented particle board); cements and concretes; sound proofing; textured and masonry paints; paints (as a rheology modifier); antimicrobial fire retardant wall boards; sealants and adhesives and caulks; insulation; partial or complete asbestos replacement; and foams.

The Ceiling Tile

Perlite-based Ceiling Tiles

In certain embodiments comprising, a ceiling tile base composition comprises perlite. In such embodiments, a ceiling tile, based on the total dry weight of the ceiling tile, may comprise at least about 30% by weight perlite, at least about 35% by weight perlite, at least about 40% by weight perlite, at least about 45% by weight perlite, at least about 50% by weight perlite, at least about 55% by weight perlite, at least about 60% by weight perlite, at least about 65% by weight perlite, at least about 70% by weight perlite, at least about 75% by weight perlite, at least about 80% by weight, perlite, at least about 85% by weight perlite, or at least about 90% by weight perlite. In such embodiments, the ceiling tile may comprise from about 30% by weight to about 90% by weight perlite, based on the total weight of the ceiling tile, for example, from about 35% by weight to about 85% by weight, from about 55% by weight to about 85% by weight, or from about 60% by weight to about 80% by weight, or from about 65% by weight to about 80% by weight, or from about 70% by weight to about 80% by weight, or up to about 79% by weight, or up to about 78% by weight, or up to about 77% by weight, or up to about 76% by weight, or up to about 75% by weight perlite, based on the total dry weight of the ceiling tile.

In certain embodiments, including for example, the embodiments described above in which the ceiling tile comprises perlite and microfibrillated cellulose, the ceiling tile further comprises wood pulp or paper pulp. For the avoidance of doubt, the wood pulp or paper pulp is distinct from the microfibrillated cellulose composition.

Advantageously, by including a microfibrillated cellulose composition, the amount of wood pulp or paper pulp in the ceiling tile may be reduced or eliminated whilst maintaining or improving one or more mechanical properties of the ceiling tile, such as flexural strength and/or modulus of rupture.

In certain embodiments, when wood pulp or paper pulp is present, the ceiling tile comprises from about 0.1% by weight to about 30% by weight wood pulp or paper pulp, based on the total dry weight of the ceiling tile. In certain embodiments, the ceiling tile comprises from about 1% by weight to about 30% by weight wood pulp or paper pulp, for example, from about 5% by weight to about 25% by weight wood pulp or paper pulp, or from about 5% by weight to about 20% by weight wood pulp or paper pulp, or from about 5% by weight to about 15% by weight wood pulp or paper pulp, or from about 5% by weight to about 10% by weight wood pulp or paper pulp.

In certain additional embodiments, the ceiling tile comprises up to about 40% by weight wood pulp or paper pulp, for example, up to about 35% by weight wood pulp or paper pulp, or up to about 30% by weight wood pulp or paper pulp, or up to about 25% by weight wood pulp or paper pulp, or up to about 22.5% by weight wood pulp or paper pulp, or up to about 20% by weight wood pulp or paper pulp, or up to about 17.5% by weight wood pulp or paper pulp, or up to about 15% by weight wood pulp or paper pulp, or up to about 12.5% by weight wood pulp or paper pulp, or up to about 10% by weight wood pulp or paper pulp. In certain embodiments wood pulp or paper pulp is entirely eliminated from the ceiling tile.

In certain embodiments, including for example, the embodiments described above in which the ceiling tile comprises perlite, microfibrillated cellulose and wood pulp or paper pulp, the ceiling tile comprises up to about 50% by weight of a microfibrillated cellulose composition, based on the total dry weight of the ceiling tile. The microfibrillated cellulose may or may not comprise an inorganic particulate material. When the microfibrillated cellulose composition added to the ceiling tile composition comprises an inorganic particulate material, the inorganic particulate material may be the same as, or different from, other inorganic particulate materials present in the ceiling tile composition.

In other embodiments, including the foregoing embodiments comprising perlite, a microfibrillated cellulose composition and wood pulp or paper pulp, the ceiling tile comprises from 0.1% by weight to about 40% by weight of the microfibrillated cellulose composition, for example, from about 0.5 wt. % to about 30% by weight, or from about 1 wt. % to about 25% by weight, or from about 2% by weight to about 20% by weight, or from about 3% by weight to about 20% by weight, or from about 4% by weight to about 20% by weight, or from about 5% by weight to about 20% by weight, or from about 7.5% by weight to about 20% by weight, or from about 10% by weight to about 20% by weight, or from about 12.5% by weight to about 17.5% by weight of the microfibrillated cellulose composition, based on the total dry weight of the ceiling tile.

In certain other embodiments, including for example, the embodiments described above in which the ceiling tile comprises perlite, microfibrillated cellulose and wood pulp or paper pulp, the ceiling tile comprises from about 0.1% by weight to about 5% by weight of the microfibrillated cellulose composition, based on the total dry weight of the ceiling tile, for example, from about 0.5% by weight to about 5%, or from about 1% by weight to about 4% by weight, or from about 1.5% by weight to about 4% by weight, or from about 2% by weight to about 4% by weight. Even addition of such relatively minor amounts of a microfibrillated cellulose composition may enhance one or more mechanical properties (e.g., flexural strength) of the ceiling tile. In such embodiments, the ceiling tile may comprise from about 10% by weight to about 30% by weight wood or paper pulp and up to about 85% by weight perlite, for example, from about 15% by weight to about 25% by weight wood or paper pulp and up to about 80% by weight perlite, or from about 20% by weight to about 25% by weight wood pulp or paper pulp and up to about 75% by weight perlite.

As described herein, the microfibrillated cellulose composition may comprise an inorganic particulate material, which may or may not have been added during manufacture of the microfibrillated cellulose composition. Based on the total dry weight of the microfibrillated cellulose composition, the composition may comprise from about 1% by weight to about 99% by weight microfibrillated cellulose and from 99% by weight to about 1% by weight inorganic particulate material (e.g., calcium carbonate or kaolin). In many instances, the ceiling tile composition may comprise some clay (e.g., kaolin), calcium carbonate or some other organic particulate material. In such situations, the microfibrillated cellulose composition may be produced using the same inorganic particulate material that is present in the ceiling tile base composition. Thus, the microfibrillated cellulose composition can be used without altering the base ceiling tile composition.

Alternatively, in some other instances where there is either no other organic particulate material or very little in the base ceiling tile composition, a high percentage of microfibrillated cellulose composition with little to no inorganic particulate material present or even an organic particulate material-free microfibrillated cellulose composition is suitable for incorporation in the base ceiling tile composition.

In some embodiments, including the foregoing microfibrillated cellulose compositions with reduced or essentially no inorganic particulate material present in such composition, ratios of 1:1 microfibrillated cellulose to inorganic particulate material (by weight), or 3:1 microfibrillated cellulose to inorganic particulate material, or even 166:1 microfibrillated cellulose to inorganic particulate material, may be suitable for incorporation into the base ceiling tile composition.

In certain embodiments, including for example, the embodiments described above in which the ceiling tile comprises perlite and microfibrillated cellulose, and does not comprise wood pulp or paper pulp, the ceiling tile comprises up to about 50% by weight of the microfibrillated cellulose composition, based on the total dry weight of the ceiling tile. The microfibrillated cellulose may or may not comprise an inorganic particulate material. When the microfibrillated cellulose composition added to the ceiling tile composition comprises an inorganic particulate material, the inorganic particulate material may be the same as, or different from, other inorganic particulate materials in the ceiling tile composition.

In certain embodiments, including the embodiments described above that contain perlite, and microfibrillated cellulose, but do not contain wood pulp or paper pulp, the ceiling tile comprises from 0.1% by weight to about 40% by weight of the microfibrillated cellulose composition, for example, from about 0.5 wt. % to about 30% by weight, or from about 1 wt. % to about 25% by weight, or from about 2% by weight to about 20% by weight, or from about 3% by weight to about 20% by weight, or from about 4% by weight to about 20% by weight, or from about 5% by weight to about 20% by weight, or from about 7.5% by weight to about 20% by weight, or from about 10% by weight to about 20% by weight, or from about 12.5% by weight to about 17.5% by weight of the microfibrillated cellulose composition, based on the total dry weight of the ceiling tile.

In certain other embodiments, including for example, the embodiments described above in which the ceiling tile comprises perlite and does not comprise wood pulp or paper pulp, the ceiling tile comprises from about 0.1% by weight to about 5% by weight of the microfibrillated cellulose composition, based on the total dry weight of the ceiling tile, for example, from about 0.5% by weight to about 5%, or from about 1% by weight to about 4% by weight, or from about 1.5% by weight to about 4% by weight, or from about 2% by weight to about 4% by weight. Even addition of such relatively minor amounts of the microfibrillated cellulose may enhance one or more mechanical properties (e.g., flexural strength) of the ceiling tile.

As described herein, the microfibrillated cellulose composition may comprise an inorganic particulate material, which may or may not have been added during manufacture of the microfibrillated cellulose composition. Based on the total dry weight of the microfibrillated cellulose composition, the composition may comprise from about 1% by weight to about 99% by weight microfibrillated cellulose and from 99% by weight to about 1% by weight inorganic particulate material (e.g., calcium carbonate or kaolin). In many instances, the ceiling tile composition may comprise some clay (e.g., kaolin), calcium carbonate or some other organic particulate material. In such situations, the microfibrillated cellulose composition may be produced using the same inorganic particulate material that is present in the ceiling tile base composition. Thus, the microfibrillated cellulose composition can be used without altering the base ceiling tile composition.

Alternatively, in some other instances where there is either no other organic particulate material or very little in the base ceiling tile composition, a high percentage of pulp microfibrillated cellulose composition with little to no inorganic particulate material present or even an organic particulate material-free microfibrillated cellulose composition may be beneficial for incorporation in the base ceiling tile composition.

In some embodiments, including the foregoing microfibrillated cellulose compositions with reduced or essentially no inorganic particulate material present in such composition, ratios of 1:1 microfibrillated cellulose to inorganic particulate material (by weight), or 3:1 microfibrillated cellulose to inorganic particulate material, or even 166:1 microfibrillated cellulose to inorganic particulate material, may be suitable for incorporation into the base ceiling tile composition.

Mineral Wool (or Mineral Fibres)

In certain embodiments, including for example, the embodiments described above in which the ceiling tile comprises perlite and microfibrillated cellulose, and does not comprise wood pulp or paper pulp, the ceiling tile may further comprise mineral wool. The terms mineral wool and mineral fibres are used interchangeably herein.

Mineral wool, sometimes also referred to as rock wool or stone wool, is a substance resembling matted wool, which is made from inorganic mineral material. It is routinely used in insulation and packaging materials. Mineral wools may be prepared as glass wools, stone wools or ceramic fiber wools. Thus, mineral wool is a generic name for fibrous material that may be formed by spinning or drawing molten minerals. Mineral wool is also known as mineral fiber, mineral cotton, and vitreous fiber. Mineral wools have excellent fire resistance properties, where the material is used in a variety of applications.

Rock wool is made from basalt rock and chalk. These minerals are melted together at very high temperatures (e.g., 1600° C. into lava, which is blown into a spinning chamber and pulled into fibers resembling "cotton candy").

In certain embodiments, the ceiling tiles may comprise mineral wool and perlite and up to about 50% by weight of a microfibrillated cellulose composition, based on the total dry weight of the ceiling tile. The microfibrillated cellulose composition may or may not comprise an inorganic particulate material. When the microfibrillated cellulose composition is added to the ceiling tile composition it comprises an inorganic particulate material, the inorganic particulate material may be the same as, or different from, other inorganic particulate materials in the ceiling tile composition.

In certain embodiments, including the foregoing embodiments comprising perlite, mineral wool and a microfibrillated cellulose composition, the ceiling tile comprises from 0.1% by weight to about 40% by weight of a microfibrillated cellulose composition, for example, from about 0.5 wt. % to about 30% by weight, or from about 1 wt. % to about 25% by weight, or from about 2% by weight to about 20% by weight, or from about 3% by weight to about 20% by weight, or from about 4% by weight to about 20% by weight, or from about 5% by weight to about 20% by weight, or from about 7.5% by weight to about 20% by weight, or from about 10% by weight to about 20% by weight, or from about 12.5% by weight to about 17.5% by weight of the microfibrillated cellulose composition, based on the total dry weight of the ceiling tile.

In certain other embodiments, including for example, the embodiments described above in which the ceiling tile comprises perlite and mineral wool, and a microfibrillated cellulose composition, the ceiling tile product comprises from about 0.1% by weight to about 10% by weight of the microfibrillated cellulose composition, based on the total dry weight of the ceiling tile, for example, from about 0.5% by weight to about 8%, or from about 1% by weight to about 6% by weight, or from about 1.5% by weight to about 4% by weight, or from about 2% by weight to about 4% by weight.

In certain embodiments, the ceiling tile further comprises mineral wool in an amount up to about 95% by weight based on the total dry weight of the ceiling tile, or up to about 90% by weight based on the total dry weight of the ceiling tile, or up to about 85% by weight based on the total dry weight of the ceiling tile, or up to about 80% by weight based on the total dry weight of the ceiling tile, or up to about 75% by weight based on the total dry weight of the ceiling tile, or up to about 70% by weight based on the total dry weight of the ceiling tile or up to about 65% by weight based on the total dry weight of the ceiling tile, or up to about 60% by weight based on the total dry weight of the ceiling tile, or up to about 55% by weight based on the total dry weight of the ceiling tile, or up to about 50% by weight based on the total dry weight of the ceiling tile, or up to about 55% by weight based on the total dry weight of the ceiling tile, or up to about 50% by weight based on the total dry weight of the ceiling tile, or up to about 45% by weight based on the total dry weight of the ceiling tile, or up to about 40% by weight based on the total dry weight of the ceiling tile, or up to about 35% by weight based on the total dry weight of the ceiling tile, or for example from about 10% by weight to about 75% by weight, or about 15% by weight to about 65% by weight, or about 20% by weight to about 55% by weight, or about 25% by weight to about 45% by weight, based on the total dry weight of the ceiling tile product.

Such embodiments, including those described above for ceiling tile, comprising mineral wool, perlite and a microfibrillated cellulose composition, may comprise perlite in an amount up to 65% by weight, based on the total dry weight of the ceiling tile, for example from 30% by weight to 60% by weight, or from 35% by weight to 55% by weight, or from 35% by weight to 45% by weight. Even addition of relatively minor amounts of a microfibrillated cellulose composition to ceiling tiles may enhance one or more mechanical properties (e.g., flexural strength) of such products.

In certain embodiments, the ceiling tile comprising the microfibrillated cellulose composition has a flexural strength of at least about 400 kPa, for example, at least about 450 kPa, or at least about 500 kPa, or at least about 550 kPa, or at least about 600 kPa, or at least about 650 kPa, or at least about 700 kPa, or at least about 750 kPa, or at least about 800 kPa, or at least about 850 kPa, or at least about 900 kPa.

In certain embodiments, including the embodiments described above comprising mineral wool, perlite and a microfibrillated cellulose composition up to about 50% by weight of the microfibrillated cellulose composition may be present, based on the total dry weight of the ceiling tile. In such embodiments, the microfibrillated cellulose composition may comprise an inorganic particulate material, which may or may not have been added during manufacture of the microfibrillated cellulose composition. Based on the total dry weight of the microfibrillated cellulose composition, the composition may comprise from about 1% by weight to about 99% by weight microfibrillated cellulose and from 99% by weight to about 1% by weight inorganic particulate material (e.g., calcium carbonate).

In certain embodiments the ceiling tile may comprise mineral wool or the product may eliminate mineral wool. Mineral wool may be a component of the composition for the ceiling tile in a broad range of from about 0 wt. % to about 75 wt. % of mineral wool, based on the total dry weight of the ceiling tile in combination with a microfibrillated cellulose composition for example, from about 0.5 wt. % to about 40% by weight, or from about 1 wt. % to about 35% by weight, or from about 2% by weight to about 30% by weight, or from about 3% by weight to about 25% by weight, or from about 4% by weight to about 20% by weight, or from about 5% by weight to about 15% by weight, or from about 6% by weight to about 20% by weight, or from about 8% by weight to about 30% by weight, or from about 12.5% by weight to about 17.5% by weight of the microfibrillated cellulose composition, based on the total dry weight of the ceiling tile.

In the foregoing embodiments, the ceiling tile may comprise wood or paper pulp with or without the addition of starch. When present, the wood pulp or paper pulp may be present in an amount of up to 35% by weight with mineral wool being present in an amount up to about 55% by weight and a microfibrillated cellulose composition of up to about 10%. If starch is present as a binder, or additional organic particulate materials are present in the ceiling tile base composition, the percentages of the remaining components may be suitably adjusted.

In further embodiments, the ceiling tile may comprise perlite, mineral wool and a microfibrillated cellulose composition, with or without the addition of starch. When present, the perlite may be present in an amount of up to 45% by weight, with mineral wool being present in an amount up to about 35% by weight and a microfibrillated cellulose composition of up to about 20%, by weight based on the total dry weight of the ceiling tile. If starch is present as a binder, the percentages of the remaining components are suitably adjusted. Similarly, if inorganic particulate material is present, the remaining components are suitably adjusted, or in some instances may be eliminated from the composition.

In certain other embodiments, including for example, the embodiments described above in which the ceiling tile comprises perlite, mineral wool and a microfibrillated cellulose composition, the ceiling tile comprises from about 0.1% by weight to about 8% by weight of the microfibrillated cellulose composition, based on the total dry weight of the ceiling tile, for example, from about 0.5% by weight to about 5%, or from about 1% by weight to about 4% by weight, or from about 1.5% by weight to about 4% by weight, or from about 2% by weight to about 4% by weight. Even addition of such relatively minor amounts of the microfibrillated cellulose may enhance one or more mechanical properties (e.g., flexural strength) of the ceiling tile.

The microfibrillated cellulose composition can be prepared in accordance with the procedures outlined in this specification including by fibrillating cellulose-containing pulps together with an organic particulate material. Based on the total dry weight of such microfibrillated cellulose compositions, the inorganic particulate may constitute up to about 99% of the total dry weight, for example, up to about 90%, or up to about 80 wt. %, or up to about 70 wt. %, or up to about 60 wt. %, or up to about 50 wt. %, or up to about 40%, or up to about 30%, or up to about 20%, or up to about 10%, or up to about 5% of the total dry weight, or up to about 1% or up to 0.5% of the total dry weight of the microfibrillated cellulose composition.

Alternatively, the microfibrillated cellulose composition may be essentially free of organic particulate material and comprise no more than about 0.6 wt. % of inorganic particulate material.

Based on the total dry weight of the microfibrillated cellulose composition, the microfibrillated cellulose may constitute up to about 99.4% of the total dry weight, for example, up to about 99%, up to about 90%, or up to about 80 wt. %, or up to about 70 wt. %, or up to about 60 wt. %, or up to about 50 wt. %, or up to about 40%, or up to about 30%, or up to about 20%, or up to about 10%, or up to about 5% of the total dry weight of the microfibrillated cellulose composition.

In certain embodiments, the weight ratio of inorganic particulate material to microfibrillated cellulose in the microfibrillated cellulose composition is from about 10:1 to about 1:2, for example, from about 8:1 to about 1:2, or from about 6:1 to about 2:3, or from about 5:1 to about 2:3, or from about 5:1 to about 1:1, or about 4:1 to about 1:1, or from about 3:1 to about 1.1, or from about 2:1 to about 1.1, or about 1:1.

In certain embodiments, the microfibrillated cellulose composition is substantially free of inorganic particulate material. By substantially free, of inorganic particulate material is meant less than about 0.6% by weight, less than 0.5% by weight, less than 0.4% by weight, less than 0.3% by weight, less than 0.2% by weight, less than 0.1% by weight of inorganic particulate material based upon the total dry weight of the microfibrillated cellulose composition.

Flooring Products and Other Construction Products

In certain embodiments, a flooring product or construction product comprises up to about 10% by weight microfibrillated cellulose (i.e., derived from the microfibrillated cellulose composition which may or may not comprise inorganic particulate material), based on the total dry weight of the flooring product or construction product, for example, up to about 9% by weight, or up to about 8% by weight, or up to about 7% by weight or up to about 6% by weight, or up to about 5% by weight, or up to about 4% by weight, or up to about 3% by weight, or up to about 2% by weight, or up to about 1% by weight microfibrillated cellulose. In certain embodiments, the flooring product or construction product comprises at least about 0.1% by weight microfibrillated cellulose, for example, at least about 0.25% by weight, or at least about 0.5% by weight microfibrillated cellulose. The microfibrillated cellulose may or may not comprise an inorganic particulate material. When the microfibrillated cellulose composition added to the flooring product or construction product composition comprises an inorganic particulate material, the inorganic particulate material may be the same as, or different from, other inorganic particulate materials in the flooring product or construction product composition.

Compositions and methods of preparing flooring materials and construction materials may be formulated and prepared in accordance with the compositions and methods described in this specification for ceiling tiles. An exemplary fibreboard composition is presented in Example 5. The fibreboard was made in accordance with the procedures used to produce ceiling tiles as set forth in Example 1.

The Microfibrillated Cellulose

The microfibrillated cellulose may be derived from any suitable source, as described herein.

In certain embodiments, the microfibrillated cellulose has a $d_{50}$ ranging from about 5 to µm about 500 µm, as measured by laser light scattering. In certain embodiments, the microfibrillated cellulose has a $d_{50}$ of equal to or less than about 400 µm, for example equal to or less than about 300 µm, or equal to or less than about 200 µm, or equal to or less than about 150 µm, or equal to or less than about 125 µm, or equal to or less than about 100 µm, or equal to or less than about 90 µm, or equal to or less than about 80 µm, or equal to or less than about 70 µm, or equal to or less than about 60 µm, or equal to or less than about 50 µm, or equal to or less than about 40 µm, or equal to or less than about 30 µm, or equal to or less than about 20 µm, or equal to or less than about 10 µm.

In certain embodiments, the microfibrillated cellulose has a modal fibre particle size ranging from about 0.1-500 µm. In certain embodiments, the microfibrillated cellulose has a modal fibre particle size of at least about 0.5 µm, for example at least about 10 µm, or at least about 50 µm, or at least about 100 µm, or at least about 150 µm, or at least about 200 µm, or at least about 300 µm, or at least about 400 µm.

Unless otherwise stated, particle size properties of the microfibrillated cellulose materials are as measured by the well-known conventional method employed in the art of laser light scattering, using a Malvern Mastersizer S machine as supplied by Malvern Instruments Ltd (or by other methods which give essentially the same result).

Details of the procedure used to characterise the particle size distributions of mixtures of inorganic particle material and microfibrillated cellulose using a Malvern Mastersizer S machine are provided below.

The particle size distribution is calculated from Mie theory and gives the output as a differential volume based distribution. The presence of two distinct peaks is interpreted as arising from the mineral (finer peak) and fibre (coarser peak).

The finer mineral peak is fitted to the measured data points and subtracted mathematically from the distribution to leave the fibre peak, which is converted to a cumulative distribution. Similarly, the fibre peak is subtracted mathematically from the original distribution to leave the mineral peak, which is also converted to a cumulative distribution. Both these cumulative curves may then be used to calculate the mean particle equivalent spherical diameter (e.s.d) ($d_{50}$), which may be determined in the same manner as it is for the Sedigraph infra, and the steepness of the distribution ($d_{30}/d_{70} \times 100$). The differential curve may be used to find the modal particle size for both the mineral and fibre fractions.

Additionally or alternatively, the microfibrillated cellulose may have a fibre steepness equal to or greater than about 10, as measured by Malvern. Fibre steepness (i.e., the steepness of the particle size distribution of the fibres) is determined by the following formula:

$$\text{Steepness} = 100 \times (d_{30}/d_{70})$$

The microfibrillated cellulose may have a fibre steepness equal to or less than about 100. The microfibrillated cellulose may have a fibre steepness equal to or less than about 75, or equal to or less than about 50, or equal to or less than about 40, or equal to or less than about 30. The microfibrillated cellulose may have a fibre steepness from about 20 to about 50, or from about 25 to about 40, or from about 25 to about 35, or from about 30 to about 40.

In certain embodiments, the microfibrillated cellulose has a fibre steepness of from about 20 to about 50.

The Inorganic Particulate Material

The inorganic particulate material may, for example, be an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, huntite, mineral wool, hydromagnesite, ground glass, perlite or diatomaceous earth, or wollastonite, or titanium dioxide, or magnesium hydroxide, or aluminium trihydrate, lime, graphite, or combinations thereof.

In certain embodiments, the inorganic particulate material comprises or is calcium carbonate, magnesium carbonate, dolomite, gypsum, an anhydrous kandite clay, perlite, diatomaceous earth, mineral wool, wollastonite, magnesium hydroxide, or aluminium trihydrate, titanium dioxide or combinations thereof.

In certain embodiments, the inorganic particulate material may be a surface-treated inorganic particulate material. For instance, the inorganic particulate material may be treated with a hydrophobizing agent, such as a fatty acid or salt thereof. For example, the inorganic particulate material may be a stearic acid treated calcium carbonate.

An exemplary inorganic particulate material for use in the presently disclosed composition is calcium carbonate. Hereafter, the composition may tend to be discussed in terms of calcium carbonate, and in relation to aspects where the calcium carbonate is processed and/or treated. The disclosure should not be construed as being limited to such embodiments.

Particulate calcium carbonate may be obtained from a natural source by grinding. Ground calcium carbonate (GCC) is typically obtained by crushing and then grinding a mineral source such as chalk, marble or limestone, which may be followed by a particle size classification step, in order to obtain a product having the desired degree of fineness. Other techniques such as bleaching, flotation and magnetic separation may also be used to obtain a product having the desired degree of fineness and/or colour. The particulate solid material may be ground autogenously, i.e. by attrition between the particles of the solid material themselves, or, alternatively, in the presence of a particulate grinding medium comprising particles of a different material from the calcium carbonate to be ground. These processes may be carried out with or without the presence of a dispersant and biocides, which may be added at any stage of the process.

Precipitated calcium carbonate (PCC) may be used as the source of particulate calcium carbonate, and may be produced by any of the known methods available in the art. TAPPI Monograph Series No 30, "Paper Coating Pigments", pages 34-35 describes the three main commercial processes for preparing precipitated calcium carbonate which is suitable for use in preparing products for use in the paper industry, but may also be used in the practice of the present disclosure. In all three processes, a calcium carbonate feed material, such as limestone, is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process the milk of lime is contacted with soda ash to produce, by double decomposition, a precipitate of calcium carbonate and a solution of sodium hydroxide. The sodium hydroxide may be substantially completely separated from the calcium carbonate if this process is used commercially. In the third main commercial process the milk of lime is first contacted with ammonium chloride to give a calcium chloride solution and ammonia gas. The calcium chloride solution is then contacted with soda ash to produce by double decomposition precipitated calcium carbonate and a solution of sodium chloride. The crystals can be produced in a variety of different shapes and sizes, depending on the specific reaction process that is used. The three main forms of PCC crystals are aragonite, rhombohedral and scalenohedral (e.g., calcite), all of which are suitable for use in the disclosed composition, including mixtures thereof.

In certain embodiments, the PCC may be formed during the process of producing microfibrillated cellulose.

Wet grinding of calcium carbonate involves the formation of an aqueous suspension of the calcium carbonate which may then be ground, optionally in the presence of a suitable dispersing agent. Reference may be made to, for example, EP-A-614948 (the contents of which are incorporated by reference in their entirety) for more information regarding the wet grinding of calcium carbonate.

When the inorganic particulate material is obtained from naturally occurring sources, it may be that some mineral impurities will contaminate the ground material. For example, naturally occurring calcium carbonate can be present in association with other minerals. Thus, in some embodiments, the inorganic particulate material includes an amount of impurities. In general, however, the inorganic particulate material will contain less than about 5% by weight, or less than about 1% by weight, of other mineral impurities.

Unless otherwise stated, particle size properties referred to herein for the inorganic particulate materials are as measured in a well-known manner by sedimentation of the particulate material in a fully dispersed condition in an aqueous medium using a Sedigraph 5100 machine as supplied by Micromeritics Instruments Corporation, Norcross, Ga., USA (telephone: +1 770 662 3620; web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value.

Alternatively, where stated, the particle size properties referred to herein for the inorganic particulate materials are as measured by the well-known conventional method employed in the art of laser light scattering, using a Malvern Mastersizer S machine as supplied by Malvern Instruments Ltd (or by other methods which give essentially the same result). In the laser light scattering technique, the size of particles in powders, suspensions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value.

The inorganic particulate material may have a particle size distribution in which at least about 10% by weight of the particles have an e.s.d of less than 2 μm, for example, at least about 20% by weight, or at least about 30% by weight, or at least about 40% by weight, or at least about 50% by weight, or at least about 60% by weight, or at least about 70% by weight, or at least about 80% by weight, or at least about 90% by weight, or at least about 95% by weight, or about 100% of the particles have an e.s.d of less than 2 μm.

In another embodiment, the inorganic particulate material has a particle size distribution, as measured using a Malvern Mastersizer S machine, in which at least about 10% by volume of the particles have an e.s.d of less than 2 μm, for example, at least about 20% by volume, or at least about 30% by volume, or at least about 40% by volume, or at least about 50% by volume, or at least about 60% by volume, or at least about 70% by volume, or at least about 80% by volume, or at least about 90% by volume, or at least about 95% by volume, or about 100% of the particles by volume have an e.s.d of less than 2 μm.

Unless otherwise stated, particle size properties of the microfibrillated cellulose materials are as measured by the well-known conventional method employed in the art of laser light scattering, using a Malvern Mastersizer S machine as supplied by Malvern Instruments Ltd (or by other methods which give essentially the same result).

Details of the procedure used to characterize the particle size distributions of mixtures of inorganic particle material and microfibrillated cellulose using a Malvern Mastersizer S machine are provided below.

In certain embodiments, the inorganic particulate material is kaolin clay. Hereafter, this section of the specification may tend to be discussed in terms of kaolin, and in relation to aspects where the kaolin is processed and/or treated. The disclosure should not be construed as being limited to such embodiments. Thus, in some embodiments, kaolin is used in an unprocessed form.

Kaolin clay used in the disclosed composition may be a processed material derived from a natural source, namely raw natural kaolin clay mineral. The processed kaolin clay may typically contain at least about 50% by weight kaolinite. For example, most commercially processed kaolin clays contain greater than about 75% by weight kaolinite and may contain greater than about 90%, in some cases greater than about 95% by weight of kaolinite.

The Kaolin clay may be prepared from the raw natural kaolin clay mineral by one or more other processes which are well known to those skilled in the art, for example by known refining or beneficiation steps.

For example, the clay mineral may be bleached with a reductive bleaching agent, such as sodium hydrosulfite. If sodium hydrosulfite is used, the bleached clay mineral may optionally be dewatered, and optionally washed and again optionally dewatered, after the sodium hydrosulfite bleaching step.

The clay mineral may be treated to remove impurities, e.g., by flocculation, flotation, or magnetic separation techniques well known in the art. Alternatively the clay mineral may be untreated in the form of a solid or as an aqueous suspension.

The process for preparing the particulate kaolin clay may also include one or more comminution steps, e.g., grinding or milling. Light comminution of a coarse kaolin is used to give suitable delamination thereof. The comminution may be carried out by use of beads or granules of a plastic (e.g., nylon), sand or ceramic grinding or milling aid. The coarse kaolin may be refined to remove impurities and improve physical properties using well known procedures. The kaolin clay may be treated by a known particle size classification procedure, e.g., screening and centrifuging (or both), to obtain particles having a desired $d_{50}$ value or particle size distribution.

Methods of Manufacturing Microfibrillated Cellulose and Inorganic Particulate Material In certain embodiments, the microfibrillated cellulose may be prepared in the presence of or in the absence of the inorganic particulate material.

The microfibrillated cellulose may be derived from fibrous substrate comprising cellulose. The fibrous substrate comprising cellulose may be derived from any suitable source, such as wood, grasses (e.g., sugarcane, bamboo) or rags (e.g., textile waste, cotton, hemp or flax). The fibrous substrate comprising cellulose may be in the form of a pulp (i.e., a suspension of cellulose fibres in water), which may be prepared by any suitable chemical or mechanical treatment, or combination thereof. For example, the pulp may be a chemical pulp, or a chemithermomechanical pulp, or a mechanical pulp, or a recycled pulp, or a papermill broke, or a papermill waste stream, or waste from a papermill, or a dissolving pulp, kenaf pulp, market pulp, partially carboxymethylated pulp, abaca pulp, hemlock pulp, birch pulp, grass pulp, bamboo pulp, palm pulp, peanut shell, or a combination thereof. The cellulose pulp may be beaten (for example in a Valley beater) and/or otherwise refined (for example, processing in a conical or plate refiner) to any predetermined freeness, reported in the art as Canadian standard freeness (CSF) in $cm^3$. CSF means a value for the freeness or drainage rate of pulp measured by the rate that a suspension of pulp may be drained. For example, the cellulose pulp may have a Canadian standard freeness of about 10 $cm^3$ or greater prior to being microfibrillated. The cellulose pulp may have a CSF of about 700 $cm^3$ or less, for example, equal to or less than about 650 $cm^3$, or equal to or less than about 600 $cm^3$, or equal to or less than about 550 cm$^3$, or equal to or less than about 500 cm$^3$, or equal to or less than about 450 cm$^3$, or equal to or less than about 400 cm$^3$, or equal to or less than about 350 cm$^3$, or equal to or less than about 300 cm$^3$, or equal to or less than about 250 cm$^3$, or equal to or less than about 200 cm$^3$, or equal to or less than about 150 cm$^3$, or equal to or less than about 100 cm$^3$, or equal to or less than about 50 cm$^3$. The cellulose pulp may then be dewatered by methods well known in the art, for example, the pulp may be filtered through a screen in order to obtain a wet sheet comprising at least about 10% solids, for example at least about 15% solids, or at least about 20% solids, or at least about 30% solids, or at least about 40% solids. The pulp may be utilised in an unrefined state that is to say without being beaten or dewatered, or otherwise refined.

In certain embodiments, the pulp may be beaten in the presence of an inorganic particulate material, for example, calcium carbonate or kaolin.

For preparation of microfibrillated cellulose, the fibrous substrate comprising cellulose may be added to a grinding vessel or homogenizer in a dry state. For example, a dry paper broke may be added directly to a grinder vessel. The aqueous environment in the grinder vessel will then facilitate the formation of a pulp.

The step of microfibrillating may be carried out in any suitable apparatus, including but not limited to a refiner. In one embodiment, the microfibrillating step is conducted in a grinding vessel under wet-grinding conditions. In another embodiment, the microfibrillating step is carried out in a homogenizer. Each of these embodiments is described in greater detail below.

Wet-grinding

The grinding is suitably performed in a conventional manner The grinding may be an attrition grinding process in the presence of a particulate grinding medium, or may be an autogenous grinding process, i.e., one in the absence of a grinding medium. By grinding medium is meant a medium other than the inorganic particulate material which in certain embodiments may be co-ground with the fibrous substrate comprising cellulose.

The particulate grinding medium, when present, may be of a natural or a synthetic material. The grinding medium may, for example, comprise balls, beads or pellets of any hard mineral, ceramic or metallic material. Such materials may include, for example, alumina, zirconia, zirconium silicate, aluminium silicate or the mullite-rich material which is produced by calcining kaolinitic clay at a temperature in the range of from about 1300° C. to about 1800° C. For example, in some embodiments a Carbolite® grinding media is used. Alternatively, particles of natural sand of a suitable particle size may be used.

In other embodiments, hardwood grinding media (e.g., woodflour) may be used. Generally, the type of and particle size of grinding medium to be selected may be dependent on the properties, such as, e.g., the particle size of, and the chemical composition of, the feed suspension of material to be ground. In some embodiments, the particulate grinding medium comprises particles having an average diameter in the range of from about 0.1 mm to about 6.0 mm and in the range of from about 0.2 mm to about 4.0 mm. The grinding medium (or media) may be present in an amount up to about 70% by volume of the charge. The grinding media may be present in amount of at least about 10% by volume of the charge, for example, at least about 20% by volume of the charge, or at least about 30% by volume of the charge, or at least about 40% by volume of the charge, or at least about 50% by volume of the charge, or at least about 60% by volume of the charge.

The grinding may be carried out in one or more stages. For example, a coarse inorganic particulate material may be ground in the grinder vessel to a predetermined particle size distribution, after which the fibrous material comprising cellulose is added and the grinding continued until the desired level of microfibrillation has been obtained.

The inorganic particulate material may be wet or dry ground in the absence or presence of a grinding medium. In the case of a wet grinding stage, the coarse inorganic particulate material is ground in an aqueous suspension in the presence of a grinding medium In one embodiment, the mean particle size ($d_{50}$) of the inorganic particulate material is reduced during the co-grinding process. For example, the $d_{50}$ of the inorganic particulate material may be reduced by at least about 10% (as measured by a Malvern Mastersizer S machine), for example, the $d_{50}$ of the inorganic particulate material may be reduced by at least about 20%, or reduced by at least about 30%, or reduced by at least about 50%, or reduced by at least about 50%, or reduced by at least about 60%, or reduced by at least about 70%, or reduced by at least about 80%, or reduced by at least about 90%. For example, an inorganic particulate material having a $d_{50}$ of 2.5 μm prior to co-grinding and a $d_{50}$ of 1.5 μm post co-grinding will have been subject to a 40% reduction in particle size. In certain embodiments, the mean particle size of the inorganic particulate material is not significantly reduced during the co-grinding process. By 'not significantly reduced' is meant that the $d_{50}$ of the inorganic particulate material is reduced by less than about 10%, for example, the $d_{50}$ of the inorganic particulate material is reduced by less than about 5%.

The fibrous substrate comprising cellulose may be microfibrillated, optionally in the presence of an inorganic particulate material, to obtain microfibrillated cellulose having a $d_{50}$ ranging from about 5 to μm about 500 μm, as measured by laser light scattering. The fibrous substrate comprising cellulose may be microfibrillated, optionally in the presence of an inorganic particulate material, to obtain microfibrillated cellulose having a $d_{50}$ of equal to or less than about 400 μm, for example equal to or less than about 300 μm, or equal to or less than about 200 μm, or equal to or less than about 150 μm, or equal to or less than about 125 μm, or equal to or less than about 100 μm, or equal to or less than about 90 μm, or equal to or less than about 80 μm, or equal to or less than about 70 μm, or equal to or less than about 60 μm, or equal to or less than about 50 μm, or equal to or less than about 40 μm, or equal to or less than about 30 μm, or equal to or less than about 20 μm, or equal to or less than about 10 μm.

The fibrous substrate comprising cellulose may be microfibrillated, optionally in the presence of an inorganic particulate material, to obtain microfibrillated cellulose having a modal fibre particle size ranging from about 0.1-500 μm and a modal inorganic particulate material particle size ranging from 0.25-20 μm. The fibrous substrate comprising cellulose may be microfibrillated, optionally in the presence of an inorganic particulate material to obtain microfibrillated cellulose having a modal fibre particle size of at least about 0.5 μm, for example at least about 10 μm, or at least about 50 μm, or at least about 100 μm, or at least about 150 μm, or at least about 200 μm, or at least about 300 μm, or at least about 400 μm.

The fibrous substrate comprising cellulose may be microfibrillated, optionally in the presence of an inorganic particulate material, to obtain microfibrillated cellulose having a fibre steepness, as described above.

The grinding may be performed in a grinding vessel, such as a tumbling mill (e.g., rod, ball and autogenous), a stirred mill (e.g., SAM or Isa Mill), a tower mill, a stirred media detritor (SMD), or a grinding vessel comprising rotating parallel grinding plates between which the feed to be ground is fed.

In one embodiment, the grinding vessel is a tower mill. The tower mill may comprise a quiescent zone above one or more grinding zones. A quiescent zone is a region located towards the top of the interior of tower mill in which minimal or no grinding takes place and comprises microfibrillated cellulose and optional inorganic particulate material. The quiescent zone is a region in which particles of the grinding medium sediment down into the one or more grinding zones of the tower mill.

The tower mill may comprise a classifier above one or more grinding zones. In an embodiment, the classifier is top mounted and located adjacent to a quiescent zone. The classifier may be a hydrocyclone.

The tower mill may comprise a screen above one or more grind zones. In an embodiment, a screen is located adjacent to a quiescent zone and/or a classifier. The screen may be sized to separate grinding media from the product aqueous suspension comprising microfibrillated cellulose and optional inorganic particulate material and to enhance grinding media sedimentation.

In an embodiment, the grinding is performed under plug flow conditions. Under plug flow conditions the flow through the tower is such that there is limited mixing of the grinding materials through the tower. This means that at different points along the length of the tower mill the viscosity of the aqueous environment will vary as the fineness of the microfibrillated cellulose increases. Thus, in effect, the grinding region in the tower mill can be considered to comprise one or more grinding zones which have a characteristic viscosity. A skilled person in the art will understand that there is no sharp boundary between adjacent grinding zones with respect to viscosity.

In an embodiment, water is added at the top of the mill proximate to the quiescent zone or the classifier or the screen above one or more grinding zones to reduce the viscosity of the aqueous suspension comprising microfibrillated cellulose and optional inorganic particulate material at those zones in the mill By diluting the product microfibrillated cellulose and optional inorganic particulate material at this point in the mill it has been found that the prevention of grinding media carry over to the quiescent zone and/or the classifier and/or the screen is improved. Further, the limited mixing through the tower allows for processing at higher solids lower down the tower and dilute at the top with limited backflow of the dilution water back down the tower into the one or more grinding zones. Any suitable amount of water which is effective to dilute the viscosity of the product aqueous suspension comprising microfibrillated cellulose and optional inorganic particulate material may be added. The water may be added continuously during the grinding process, or at regular intervals, or at irregular intervals.

In another embodiment, water may be added to one or more grinding zones via one or more water injection points positioned along the length of the tower mill, or each water injection point being located at a position which corresponds to the one or more grinding zones. Advantageously, the ability to add water at various points along the tower allows for further adjustment of the grinding conditions at any or all positions along the mill.

The tower mill may comprise a vertical impeller shaft equipped with a series of impeller rotor disks throughout its length. The action of the impeller rotor disks creates a series of discrete grinding zones throughout the mill.

In another embodiment, the grinding is performed in a screened grinder, such as a stirred media detritor. The screened grinder may comprise one or more screen(s) having a nominal aperture size of at least about 250 µm, for example, the one or more screens may have a nominal aperture size of at least about 300 µm, or at least about 350 µm, or at least about 400 µm, or at least about 450 µm, or at least about 500 µm, or at least about 550 µm, or at least about 600 µm, or at least about 650 µm, or at least about 700 µm, or at least about 750 µm, or at least about 800 µm, or at least about 850 µm, or at or least about 900 µm, or at least about 1000 µm. The screen sizes noted immediately above are applicable to the tower mill embodiments described above.

As noted above, the grinding may be performed in the presence of a grinding medium. In an embodiment, the grinding medium is a coarse media comprising particles having an average diameter in the range of from about 1 mm to about 6 mm, for example about 2 mm, or about 3 mm, or about 4 mm, or about 5 mm.

In another embodiment, the grinding media has a specific gravity of at least about 2.5, for example, at least about 3, or at least about 3.5, or at least about 4.0, or at least about 4.5, or least about 5.0, or at least about 5.5, or at least about 6.0.

In another embodiment, the grinding media comprises particles having an average diameter in the range of from about 1 mm to about 6 mm and has a specific gravity of at least about 2.5.

In another embodiment, the grinding media comprises particles having an average diameter of about 3 mm and specific gravity of about 2.7.

As described above, the grinding medium (or media) may present in an amount up to about 70% by volume of the charge. The grinding media may be present in amount of at least about 10% by volume of the charge, for example, at least about 20% by volume of the charge, or at least about 30% by volume of the charge, or at least about 40% by volume of the charge, or at least about 50% by volume of the charge, or at least about 60% by volume of the charge.

In one embodiment, the grinding medium is present in an amount of about 50% by volume of the charge.

By "charge" is meant the composition which is the feed fed to the grinder vessel. The charge includes of water, grinding media, fibrous substrate comprising cellulose and optional inorganic particulate material, and any other optional additives as described herein.

The use of a relatively coarse and/or dense media has the advantage of improved (i.e., faster) sediment rates and reduced media carry over through the quiescent zone and/or classifier and/or screen(s).

A further advantage in using relatively coarse grinding media is that the mean particle size ($d_{50}$) of the inorganic particulate material may not be significantly reduced during the grinding process such that the energy imparted to the grinding system is primarily expended in microfibrillating the fibrous substrate comprising cellulose.

A further advantage in using relatively coarse screens is that a relatively coarse or dense grinding media can be used in the microfibrillating step. In addition, the use of relatively coarse screens (i.e., having a nominal aperture of least about 250 µm) allows a relatively high solids product to be processed and removed from the grinder, which allows a relatively high solids feed (comprising fibrous substrate comprising cellulose and inorganic particulate material) to be processed in an economically viable process. As discussed below, it has been found that a feed having a high initial solids content is desirable in terms of energy sufficiency. Further, it has also been found that product produced (at a given energy) at lower solids has a coarser particle size distribution.

The grinding may be performed in a cascade of grinding vessels, one or more of which may comprise one or more grinding zones. For example, the fibrous substrate comprising cellulose and the inorganic particulate material may be ground in a cascade of two or more grinding vessels, for example, a cascade of three or more grinding vessels, or a cascade of four or more grinding vessels, or a cascade of five or more grinding vessels, or a cascade of six or more grinding vessels, or a cascade of seven or more grinding vessels, or a cascade of eight or more grinding vessels, or a cascade of nine or more grinding vessels in series, or a cascade comprising up to ten grinding vessels. The cascade of grinding vessels may be operatively linked in series or parallel or a combination of series and parallel. The output from and/or the input to one or more of the grinding vessels in the cascade may be subjected to one or more screening steps and/or one or more classification steps.

The circuit may comprise a combination of one or more grinding vessels and homogenizer.

In an embodiment the grinding is performed in a closed circuit. In another embodiment, the grinding is performed in an open circuit. The grinding may be performed in batch mode. The grinding may be performed in a re-circulating batch mode.

As described above, the grinding circuit may include a pre-grinding step in which coarse inorganic particulate ground in a grinder vessel to a predetermined particle size distribution, after which fibrous material comprising cellulose is combined with the pre-ground inorganic particulate material and the grinding continued in the same or different grinding vessel until the desired level of microfibrillation has been obtained.

As the suspension of material to be ground may be of a relatively high viscosity, a suitable dispersing agent may be added to the suspension prior to grinding. The dispersing agent may be, for example, a water soluble condensed phosphate, polysilicic acid or a salt thereof, or a polyelectrolyte, for example a water soluble salt of a poly(acrylic acid) or of a poly(methacrylic acid) having a number average molecular weight not greater than 80,000. The amount of the dispersing agent used would generally be in the range of from 0.1 to 2.0% by weight, based on the weight of the dry inorganic particulate solid material. The suspension may suitably be ground at a temperature in the range of from 4° C. to 100° C.

Other additives which may be included during the microfibrillation step include: carboxymethyl cellulose, amphoteric carboxymethyl cellulose, oxidising agents, 2,2,6,6-Tetramethylpiperidine-1-oxyl (TEMPO), TEMPO derivatives, and wood degrading enzymes.

The pH of the suspension of material to be ground may be about 7 or greater than about 7 (i.e., basic), for example, the pH of the suspension may be about 8, or about 9, or about 10, or about 11. The pH of the suspension of material to be ground may be less than about 7 (i.e., acidic), for example, the pH of the suspension may be about 6, or about 5, or about 4, or about 3. The pH of the suspension of material to be ground may be adjusted by addition of an appropriate amount of acid or base. Suitable bases included alkali metal hydroxides, such as, for example NaOH. Other suitable bases are sodium carbonate and ammonia. Suitable acids included inorganic acids, such as hydrochloric and sulphuric acid, or organic acids. An exemplary acid is orthophosphoric acid.

The amount of inorganic particulate material, when present, and cellulose pulp in the mixture to be co-ground may be varied in order to produce a composition, for example, slurry, which is suitable for use in a ceiling tile, flooring product, or other construction product, or which may be further modified, e.g., with additional of further inorganic particulate material.

Homogenizing

Microfibrillation of the fibrous substrate comprising cellulose may be effected under wet conditions, optionally, in the presence of the inorganic particulate material, by a method in which the mixture of cellulose pulp and optional inorganic particulate material is pressurized (for example, to a pressure of about 500 bar) and then passed to a zone of lower pressure. The rate at which the mixture is passed to the low pressure zone is sufficiently high and the pressure of the low pressure zone is sufficiently low as to cause microfibrillation of the cellulose fibres. For example, the pressure drop may be affected by forcing the mixture through an annular opening that has a narrow entrance orifice with a much larger exit orifice. The drastic decrease in pressure as the mixture accelerates into a larger volume (i.e., a lower pressure zone) induces cavitation which causes microfibrillation. In an embodiment, microfibrillation of the fibrous substrate comprising cellulose may be effected in a homogenizer under wet conditions, optionally in the presence of the inorganic particulate material. In the homogenizer, the cellulose pulp and optional inorganic particulate material is pressurized (for example, to a pressure of about 500 bar), and forced through a small nozzle or orifice. The mixture may be pressurized to a pressure of from about 100 to about 1000 bar, for example to a pressure of equal to or greater than 300 bar, or equal to or greater than about 500, or equal to or greater than about 200 bar, or equal to or greater than about 700 bar. The homogenization subjects the fibres to high shear forces such that as the pressurized cellulose pulp exits the nozzle or orifice, cavitation causes microfibrillation of the cellulose fibres in the pulp.

Additional water may be added to improve flowability of the suspension through the homogenizer. The resulting aqueous suspension comprising microfibrillated cellulose and optional inorganic particulate material may be fed back into the inlet of the homogenizer for multiple passes through the homogenizer. When present, and when the inorganic particulate material is a naturally platy mineral, such as kaolin, homogenization not only facilitates microfibrillation of the cellulose pulp, but may also facilitate delamination of the platy particulate material.

An exemplary homogenizer is a Manton Gaulin (APV) homogenizer.

After the microfibrillation step has been carried out, the aqueous suspension comprising microfibrillated cellulose and optional inorganic particulate material may be screened to remove fibre above a certain size and to remove any grinding medium. For example, the suspension can be subjected to screening using a sieve having a selected nominal aperture size in order to remove fibres which do not pass through the sieve. Nominal aperture size means the nominal central separation of opposite sides of a square aperture or the nominal diameter of a round aperture. The sieve may be a BSS sieve (in accordance with BS 1796) having a nominal aperture size of 150 μm, for example, a nominal aperture size 125 µm, or 106 µm, or 90 µm, or 74 µm, or 63 µm, or 53 µm, 45 µm, or 38 µm. In one embodiment, the aqueous suspension is screened using a BSS sieve having a nominal aperture of 125 µm. The aqueous suspension may then be optionally dewatered.

It will be understood therefore that amount (i.e., % by weight) of microfibrillated cellulose in the aqueous suspension after grinding or homogenizing may be less than the amount of dry fibre in the pulp if the ground or homogenized suspension is treated to remove fibres above a selected size. Thus, the relative amounts of pulp and optional inorganic particulate material fed to the grinder or homogenizer can be adjusted depending on the amount of microfibrillated cellulose that is required in the aqueous suspension after fibres above a selected size are removed.

In certain embodiments, the microfibrillated cellulose may be prepared by a method comprising a step of microfibrillating the fibrous substrate comprising cellulose in an aqueous environment by grinding in the presence of a grinding medium (as described herein), wherein the grinding is carried out in the absence of inorganic particulate material. In certain embodiments, inorganic particulate material may be added after grinding.

In certain embodiments, the grinding medium is removed after grinding.

In other embodiments, the grinding medium is retained after grinding and may serve as the inorganic particulate material, or at least a portion thereof. In certain embodiments, additional inorganic particulate may be added after grinding.

The following procedure may be used to characterise the particle size distributions of mixtures of inorganic particulate material (e.g., GCC or kaolin) and microfibrillated cellulose pulp fibres.

Calcium Carbonate

A sample of co-ground slurry sufficient to give 3 g dry material is weighed into a beaker, diluted to 60 g with deionised water, and mixed with 5 cm³ of a solution of sodium polyacrylate of 1.5 w/v % active. Further deionised water is added with stirring to a final slurry weight of 80 g.

Kaolin

A sample of co-ground slurry sufficient to give 5 g dry material is weighed into a beaker, diluted to 60 g with deionised water, and mixed with 5 cm³ of a solution of 1.0 wt. % sodium carbonate and 0.5 wt. % sodium hexametaphosphate. Further deionised water is added with stirring to a final slurry weight of 80 g.

The slurry is then added in 1 cm³ aliquots to water in the sample preparation unit attached to the Mastersizer S until the optimum level of obscuration is displayed (normally 10-15%). The light scattering analysis procedure is then carried out. The instrument range selected was 300RF: 0.05-900, and the beam length set to 2.4 mm.

For co-ground samples containing calcium carbonate and fibre the refractive index for calcium carbonate (1.596) is used. For co-ground samples of kaolin and fibre the RI for kaolin (1.5295) is used.

The particle size distribution is calculated from Mie theory and gives the output as a differential volume based distribution. The presence of two distinct peaks is interpreted as arising from the mineral (finer peak) and fibre (coarser peak).

The finer mineral peak is fitted to the measured data points and subtracted mathematically from the distribution to leave the fibre peak, which is converted to a cumulative distribution. Similarly, the fibre peak is subtracted mathematically from the original distribution to leave the mineral peak, which is also converted to a cumulative distribution. Both these cumulative curves may then be used to calculate the mean particle size ($d_{50}$) and the steepness of the distribution ($d_{30}/d_{70} \times 100$). The differential curve may be used to find the modal particle size for both the mineral and fibre fractions.

EXAMPLES

Example 1

Three Comparative Examples (I to III) were prepared by the following method. The Comparative Examples comprise pulp and starch and are representative of convention ceiling tile compositions.

The composition of the tile slurry included mineral wool, perlite, cellulosic materials, binder, starch and mineral filler (e.g., clay, calcium carbonate). The resultant slurry was mixed with a flocculant (high molecular weight polyacrylamide, e.g., Solenis PC1350) with stirring, and then poured onto the tile-forming wire of a hand sheet former. The flocculated slurry was first drained under gravity, followed by the application of pressure to remove excess water. The wet tile was dried in a convection oven at 130° C. overnight, with the wet tile being firstly wrapped in aluminium foil at 170° C. for 1 h to cook (gelatinize) the starch.

Three Experimental Tiles (IV-VI) were prepared by an analogous method to the Comparative Examples, except the wrapping of the tile and gelatinzation of starch at 170° C. was not required.

The composition of the Comparative Examples and the Experimental Tiles is set forth in Table I.

TABLE I

| | | \multicolumn{6}{c}{Tile Compositions} | | | | | |
|---|---|---|---|---|---|---|---|
| | | I | II | III | IV | V | VI |
| Rockwool | wt. % | 32 | 32 | 32 | 32 | 32 | 32 |
| Perlite | | 35 | 35 | 35 | 43 | 43 | 43 |
| Paper Pulp | | 8 | 8 | 8 | | | |
| MFC/mineral dosage | | | | | 4 | 6 | 8 |
| Kaolin Clay | | 21 | 19 | 17 | 21 | 19 | 17 |
| starch | | 4 | 6 | 8 | | | |
| total | wt. % | 100 | 100 | 100 | 100 | 100 | 100 |
| Retention aids (on dry solid) | wt. % | 0.12 | 0.12 | 0.12 | 0.12 | 0.12 | 0.12 |

The properties of the Comparative Examples and the Experimental Tiles are set forth in Table II. These data show that by simultaneously eliminating pulp and replacing it with perlite, and eliminating starch and replacing it with microfibrillated cellulose, ceiling tiles of equivalent density and strength can be made. These have much lower moisture uptake, and improved toughness.

TABLE II

|  | I | II | III | IV | V | VI |
|---|---|---|---|---|---|---|
| Drainage time/sec | 30 | 30 | 33 | 25 | 33 | 37 |
| Density/pcf | 10.9 | 10.6 | 11.4 | 10.5 | 10.7 | 11.2 |
| Measured MOR/psi | 39.16 | 60.92 | 87.02 | 30.46 | 53.66 | 85.57 |
| Corrected MOR@ 12.49 pcf/psi | 51.66 | 85.16 | 103.84 | 43.14 | 73.32 | 105.73 |
| Toughness/J·m$^{-3}$ | 4413 | 9107 | 13500 | 4720 | 9784 | 14302 |
| Moisture uptake/% | 2.52 | 2.88 | 3.22 | 1.3 | 1.37 | 1.66 |

Example 2

The wet tiles were made as described above in the tile making process for Comparative Example III and the Experimental Tile VI. Both tiles were wrapped in aluminium foil and put in oven at 170° C. for 1 h to gelatinize the starch (VI undergoes the same process as a control). The resultant tiles were unwrapped, then dried at 130 C, and the mass change is recorded at 10 min intervals. For each tile the mass decreases approximately exponentially, from which a drying rate constant is extracted.

Table III reports the data on the drying rate experiment described above. These examples show that by replacing starch and paper pulp with microfibrillated cellulose and perlite, the drying time can be substantially reduced.

TABLE III

|  | Drying rate constant/hr$^{-1}$ | Total Drying time/min |
|---|---|---|
| III | 0.47 | 290 |
| VI | 0.87 | 200 |

Example 3

In order to study loss on ignition (LOI), the dry tile was cut into triplicates in the z-direction. The organic contents of the strips are burned off at 450° C. for 2 h in the furnace. Experimental Tile VI had lower LOI than Comparative Example III as pulp was replaced by perlite when using the composite of microfibrillated cellulose and inorganic particulate material, thereby reducing the combustible materials. In addition, Experiment Tile VI had a more homogeneous component distribution than Comparative Example III, as suggested by the lower standard deviation (STD) value. Table IV presents the LOI data for Example 3.

TABLE IV

|  |  | LOI/% | Average LOI/% | STD/% |
|---|---|---|---|---|
| III | top | 18.9% | 19.16% | 0.771% |
|  | middle | 18.6% |  |  |
|  | bottom | 20.0% |  |  |
| VI | top | 11.1% | 10.97% | 0.199% |
|  | middle | 10.7% |  |  |
|  | bottom | 11.1% |  |  |

Example 4

In this experiment, the wet strength of thin tile sheets (ca. 700 μm in thickness) were formed on filter paper by a filtration process, followed by the application of pressure at 5 bar for 5 min. was measured. The pressed wet sheets were cut into strips for tensile measurement. The composition of Comparative Examples VII and VIII are set forth in Table 5. Comparative Example VII contained no pulp, but did contain starch. Comparative Example VII contained both pulp and starch. Comparative Experiment Tile VII, as shown in Table 5, was too weak to measure the wet strength. Experimental Tile IX demonstrate an improved tensile strength compared to Comparative Examples VII and VIII when produced utilizing a composite of microfibrillated cellulose and inorganic particulate material 8 wt. % based on the total dry weight of the tile. As noted, Experimental Tile IX omitted both pulp and starch from the composition and avoided using a "cooking" (starch gelatinization process) in the manufacturing process. An improvement in tensile strength of greater than 70% was recorded for Experimental Tile IX.

TABLE V

|  |  | VII | VIII | IX |
|---|---|---|---|---|
| Rockwool | dry weight/ | 1.408 | 1.408 | 1.408 |
| Perlite | gram | 1.892 | 1.54 | 1.892 |
| Pulp |  | 0 | 0.352 | 0 |
| MFC/mineral composite |  | 0 | 0 | 0.352 |
| IMAX57 |  | 0.748 | 0.748 | 0.748 |
| starch |  | 0.352 | 0.352 | 0 |
| total |  | 4.4 | 4.4 | 4.4 |
| Retention aids (on dry solid) |  | 0.00528 | 0.00528 | 0.00528 |
| Wet tensile strength | Newton | Too weak | 0.17 | 0.24 |

Legend: IMAX57 is a paper filler grade kaolin; MFC is microfibrillated cellulose.

Example 5

A fibreboard was prepared in accordance with the process of preparing ceiling tiles in Example 1, with the exception of the components of the slurry. Table VI presents the quantitative and qualitative composition of the slurry. The wood particle used comprised spruce, which is typically used in chip boards.

TABLE VI

|  | I | II | III |
|---|---|---|---|
| Wood particle | 35 | 35 | 30 |
| Rockwool | 60 | 55 | 55 |
| Fiberlean MFC dosage |  | 5 | 5 |

TABLE VI-continued

|  |  | I | II | III |
|---|---|---|---|---|
| Calcium carbonate |  |  | 5 | 5 |
| Starch |  | 5 |  | 5 |
| total | wt. % | 100 | 100 | 100 |
| Retention aids (on dry solid) | wt. % | 0.12 | 0.12 | 0.12 |

Table VII presents data on the three fibreboard compositions. These examples show that by replacing starch with microfibrillated cellulose, the board is much stronger, and more dimensionally stable when immersed in water. In addition, a synergetic effect in strength (MOR and IB) was observed when using microcrystalline cellulose with starch simultaneously.

|  | I | II | III |
|---|---|---|---|
| Density/pcf | 17.67 | 21.22 | 20.98 |
| Measured MOR/psi | 30.22 | 228.03 | 297.62 |
| Internal Bond (IB)/psi | 0.43 | 8.53 | 11 |
| Thickness Swelling/% | 18.6 | 9.4 | 9.9 |

What is claimed is:

1. A ceiling tile comprising up to about 90% by weight mineral wool or perlite, or both mineral wool and perlite and from 0.1 to 40% by weight microfibrillated cellulose based on the total dry weight of the ceiling tile, wherein the microfibrillated cellulose has a $d_{50}$ μm of about 5 to about 500 μm and a fibre steepness of from 20 to 50.

2. The ceiling tile of claim 1, wherein the ceiling tile further comprises wood pulp or paper pulp and, optionally, starch and/or a latex binding agent.

3. The ceiling tile of claim 2, wherein the ceiling tile comprises 0.5% to 10% by weight of the microfibrillated cellulose composition, based on the total dry weight of the ceiling tile.

4. The ceiling tile according to claim 2, wherein the ceiling tile comprises 30% to 90% by weight perlite, based on the total dry weight of the ceiling tile.

5. The ceiling tile according to claim 4, wherein the ceiling tile comprises 0.5% to 25% by weight of microfibrillated cellulose, based on the total dry weight of the ceiling tile.

6. The ceiling tile according to claim 4, wherein the ceiling tile comprises: 0.5% to 25% by weight of microfibrillated cellulose, based on the total dry weight of the ceiling tile; and up to 20% by weight of wood pulp or paper pulp, based on the total dry weight of the ceiling tile.

7. The ceiling tile according to claim 2, wherein the ceiling tile comprises up to 25% by weight wood pulp or paper pulp, based on the total dry weight of the ceiling tile.

8. The ceiling tile according to claim 7, wherein the ceiling tile comprises up to 10% by weight wood pulp or paper pulp, based on the total dry weight of the ceiling tile.

9. The ceiling tile according to claim 2, wherein the microfibrillated cellulose composition further comprising one or more inorganic particulate material selected from the group consisting of calcium carbonate, magnesium carbonate, dolomite, gypsum, kaolin, halloysite, ball clay, metakaolin, kaolin, talc, mica, huntite, hydromagnesite, ground glass, diatomaceous earth, wollastonite, titanium dioxide, magnesium hydroxide, aluminium trihydrate, lime, graphite, or combinations thereof.

10. The ceiling tile according to claim 9, wherein the inorganic particulate comprises calcium carbonate or kaolin.

11. The ceiling tile of claim 1, wherein the ceiling tile comprises 0.5% to 10% by weight of the microfibrillated cellulose composition, based on the total dry weight of the ceiling tile.

12. The ceiling tile according to claim 1, wherein the ceiling tile comprises 30% to 90% by weight perlite based on the total dry weight of the ceiling tile.

13. The ceiling tile according to claim 12, wherein the ceiling tile comprises 0.5% to 25% by weight of microfibrillated cellulose, based on the total dry weight of the ceiling tile.

14. The ceiling tile according to claim 12, wherein the ceiling tile comprises: 0.5% to 25% by weight of microfibrillated cellulose, based on the total dry weight of the ceiling tile; and up to 20% by weight of wood pulp or paper pulp, based on the total dry weight of the ceiling tile.

15. The ceiling tile according to claim 1, wherein the ceiling tile has a flexural strength of at least 400 kPa.

16. The ceiling tile according to claim 1, wherein the microfibrillated cellulose composition further comprising one or more inorganic particulate material selected from the group consisting of calcium carbonate, magnesium carbonate, dolomite, gypsum, kaolin, halloysite, ball clay, metakaolin, kaolin, talc, mica, huntite, hydromagnesite, ground glass, diatomaceous earth, wollastonite, titanium dioxide, magnesium hydroxide, aluminium trihydrate, lime, graphite, or combinations thereof.

17. The ceiling tile according to claim 16, wherein the inorganic particulate comprises calcium carbonate or kaolin.

* * * * *